(12) United States Patent
Woo (10) Patent No.: US 12,352,304 B2
(45) Date of Patent: Jul. 8, 2025

(54) VACUUM SUCTION DEVICE

(71) Applicant: MSINTECH CO., LTD., Seoul (KR)

(72) Inventor: Cheol Seok Woo, Seoul (KR)

(73) Assignee: MSINTECH CO., LTD., Seoul (KR)

( * ) Notice: Subject to any disclaimer, the term of this patent is extended or adjusted under 35 U.S.C. 154(b) by 46 days.

(21) Appl. No.: 18/254,600

(22) PCT Filed: Sep. 1, 2021

(86) PCT No.: PCT/KR2021/011723
§ 371 (c)(1),
(2) Date: Nov. 27, 2023

(87) PCT Pub. No.: WO2022/114465
PCT Pub. Date: Jun. 2, 2022

(65) Prior Publication Data
US 2024/0102510 A1    Mar. 28, 2024

(30) Foreign Application Priority Data
Nov. 27, 2020 (KR) .................. 10-2020-0161921

(51) Int. Cl.
*F16B 47/00* (2006.01)
(52) U.S. Cl.
CPC .................... *F16B 47/00* (2013.01)
(58) Field of Classification Search
CPC ........ F16B 47/00; Y02B 30/00; A47G 29/087
USPC ....... 248/267, 537, 205.5–206.3, 309.4, 363, 248/499
See application file for complete search history.

(56) References Cited

U.S. PATENT DOCUMENTS

| | | | | |
|---|---|---|---|---|
| 6,932,306 | B2 * | 8/2005 | Zou | F16B 47/00 248/205.5 |
| 8,128,042 | B1 * | 3/2012 | Chen | F16B 47/006 248/205.5 |
| 9,422,970 | B1 * | 8/2016 | Fan | A47K 10/10 |
| 9,611,884 | B1 * | 4/2017 | Kuo | F16B 47/00 |
| 9,746,022 | B2 * | 8/2017 | Shi | F16B 47/00 |
| 11,585,371 | B2 * | 2/2023 | Huang | F16M 13/022 |
| 11,635,106 | B1 * | 4/2023 | Song | F16B 47/00 248/206.2 |
| 11,892,027 | B1 * | 2/2024 | Fan | F16B 45/00 |
| 11,988,245 | B1 * | 5/2024 | Lin | F16B 47/006 |
| 2004/0079848 | A1 * | 4/2004 | Wu | F16B 47/00 248/205.5 |
| 2009/0050758 | A1 * | 2/2009 | Carnevali | F16B 47/00 248/205.8 |
| 2015/0240862 | A1 * | 8/2015 | Shi | F16M 13/022 248/205.8 |
| 2015/0369276 | A1 * | 12/2015 | Balmer | F16B 47/00 248/205.8 |

(Continued)

FOREIGN PATENT DOCUMENTS

CN  103953637 A  7/2014
KR  1020090017949 A  2/2009

(Continued)

*Primary Examiner* — Muhammad Ijaz
(74) *Attorney, Agent, or Firm* — Maschoff Brennan (57) ABSTRACT

The present invention relates to a vacuum suction device which is a suction device, having a multi-suction configuration, formed in a particular structure and which thus has a very strong structure and can be easily attached and detached and, at the same time, exhibit strong adhesion during use.

10 Claims, 8 Drawing Sheets

(56) References Cited

U.S. PATENT DOCUMENTS

| | | | |
|---|---|---|---|
| 2016/0097419 A1* | 4/2016 | Huang | F16M 13/022 |
| | | | 248/205.7 |
| 2016/0215813 A1* | 7/2016 | Huang | A47G 1/17 |
| 2020/0256376 A1* | 8/2020 | Chang | F16K 15/1825 |
| 2022/0170503 A1* | 6/2022 | Bleckat | F16B 47/00 |
| 2024/0102510 A1* | 3/2024 | Woo | F16B 47/00 |
| 2024/0110634 A1* | 4/2024 | Zimmerman | F16M 13/022 |

FOREIGN PATENT DOCUMENTS

| | | |
|---|---|---|
| KR | 1020090017950 A | 2/2009 |
| KR | 101136428 B1 | 4/2012 |
| WO | 2017012202 A1 | 1/2017 |

\* cited by examiner

VACUUM SUCTION DEVICE

TECHNICAL FIELD

The present disclosure relates to a vacuum suction device, and more particularly, to a vacuum suction device formed in a specific structure so as to be detachable with easy operation, and to exhibit solid and strong suction force.

BACKGROUND ART

In general, vacuum suction devices are fixed to structures such as smooth walls, glass, and tiles by the vacuum suction force of suction plates, and are widely used for various purposes in households and offices.

Since the vacuum suction device adopts a structure allowing the suction plate to be attached to an attachment surface, anyone can easily attach or remove the vacuum suction device to or from the attachment surface without using a separate tool. In addition, damage or breakage to the attachment surface to which the vacuum suction device is attached may be prevented.

The vacuum suction device may be classified into a simple suction type consisting only of a flexible suction plate and a complex suction type having a hard cover plate combined with a suction plate of a predetermined material to provide stronger suction.

An example of the vacuum suction device of the complex suction type is disclosed in Korean Patent No. 10-1156552. The document discloses a vacuum suction device attached to an attachment surface such as glass or tile in a vacuum suction manner, the vacuum suction device including a cover disposed at an upper side of the vacuum suction device and having an insertion hole allowing one side of a hanger member to be rotatably inserted thereinto, rotation protrusions radially protruding on an inner surface thereof corresponding to an outside of the insertion hole and provided with hooks curved toward the insertion hole, a plurality of locking protrusions formed on an inner circumferential surface thereof, and a plurality of fixing pieces formed on an inner upper surface; a height adjustment member including a bottom plate having a plurality of coupling holes and formed at a bottom portion to be positioned inside the vacuum suction device, a plurality of stoppers formed on an outer top surface of the bottom plate to contact each of the locking protrusions of the cover to allow the cover to rotate only within a predetermined range, inclined surfaces formed in the spaces between the stoppers and inclined at a specific angle to allow a bottom surface of each of the locking protrusions to slidably move in contact therewith, and a fixing groove configured to fix each of the locking protrusions; a plurality of elastic locking pieces coupled to the inside of the height adjustment member and having a predetermined elasticity such that each of the fixing pieces slidably moves in contact therewith, and is caught on an end side to fix the cover; and a suction plate including a central shaft provided on a center top surface thereof to be coupled to a lower portion of the cover, the central shaft having a coupling groove in which one side of the hanger member is inserted, a locking groove formed on an outer circumferential surface of the central shaft to allow the hook of each of the rotation protrusions to be inserted and fixed thereinto, and a plurality of coupling protrusions inserted into and coupled to each of the coupling holes of the height adjustment member.

However, when the conventional vacuum suction device described above is used for a long time, sufficient suction power may not be persistently as the external force is applied to the center portion of the suction plate with the cover mounted. As a result, the device may be unintentionally moved or detached. Further, providing sufficient suction power to the suction plate requires urethane gel to be applied to the suction surface.

In addition, when the vacuum suction device is repeatedly attached and detached, parts may be damaged during the rotation operation through the height adjustment member having the elastic locking pieces and the cover, thereby shortening the service life of the product.

DISCLOSURE

Technical Problem

Therefore, the present disclosure has been made in view of the above problems, and it is one object of the present disclosure to provide a vacuum suction device of a complex suction type formed in a specific structure to provide a very solid structure and facilitate attachment and detachment while exhibiting strong suction.

Technical Solution

In accordance with one aspect of the present disclosure, provided herein is vacuum suction device including a suction plate formed in a disk shape with a predetermined thickness and provided with a disk-shaped insert having a coupling protrusion at a center thereof, the insert being configured to selectively provide suction through a bottom surface thereof; a rotor formed in a cylindrical shape and having a coupling hole formed through a center thereof and guide protrusions protruding from opposite sides of an outer circumference of the rotor, the rotor being mounted in the center of a top surface of the suction plate by the coupling hole and the coupling protrusion of the insert; a base member including a disk-shaped suction plate coupling part configured to accommodate the suction plate in a lower portion thereof; and a rotor coupling part protruding in a cylindrical shape at a center of a top surface of the suction plate coupling part to allow the rotor to be accommodated therein and to move up and down, the rotor coupling part being provided with a pair of penetrated rotor guide grooves and a pair of penetrated cap coupling grooves at a predetermined point on an outer circumferential surface thereof; and a cap formed in a wide cylindrical shape with an open bottom and having a through hole in a center thereof, the cap being rotatably mounted on an upper portion of the base member by a pair of hooks constrained in the pair of cap coupling grooves with the rotor coupling part of the base member arranged through the through hole to apply an external force to the rotor.

Preferably, a body of the insert accommodated in the suction plate may include a plurality of injection grooves formed radially at regular intervals; and a plurality of injection holes formed between the injection grooves.

Preferably, the vacuum suction device may further include a pair of anti-slip ribs protruding from an edge of the top surface of the suction plate; and a pair of rib seating grooves formed in a ceiling surface of the suction plate in a recessed manner to correspond to the anti-slip ribs.

More preferably, the suction plate may be formed of a soft synthetic resin material.

Preferably, the vacuum suction device may further include a plurality of elastic cutouts formed around the coupling hole of the rotor for smooth mounting of the coupling protrusion of the insert; and a holding step formed at a point on an inner circumferential surface of the coupling hole at a predetermined height to constrain a head portion of the coupling protrusion of the insert.

Preferably, the vacuum suction device may further include close contact ribs formed on an outer circumferential surface of the rotor and arranged at regular intervals to securely and closely contact an inner circumferential surface of the rotor coupling part of the base member when the rotor rises and to prevent friction against the base member.

In addition, preferably, the pair of cap coupling grooves formed in the rotor coupling part of the base member is formed to correspond to points facing each other such that each of the hooks of the cap is horizontally moved within a predetermined angular range, wherein the pair of rotor guide grooves formed between the pair of cap coupling grooves may be inclined at a predetermined slope such that the guide protrusions of the rotor are guided to move up and down while rotating within the same angular range as the hooks, wherein the pair of rotor guide grooves may be provided at an upper end thereof with a fixing groove extending downward to fix the guide protrusions in place.

Preferably, the vacuum suction device may further include a pair of hooks protruding at points adjacent to the through hole in the ceiling surface of the cap, the hooks being spaced apart from each other by 180°; and a guide protrusion coupling part formed between the pair of hooks over the ceiling surface and the inner circumferential surface, wherein the guide protrusions may be fitted into and constrained by the guide protrusion coupling part.

Advantageous Effects

According to the embodiments of the present disclosure configured as described above, a suction device is formed in a specific structure so as to be fixed to glass, a tile, a smooth wall, or the like in a suction manner such that various objects can be hung or fixedly supported. Accordingly, a high-quality suction device having a more solid structure and exhibiting excellent suction power may be provided.

In other words, a soft synthetic resin material that makes up the suction plate may provide sufficient suction without requiring an additional process of coating with urethane gel or the like. In addition, the insert of a specific structure built in the suction plate may prevent unintended deformation even when the suction plate is repeatedly attached and detached.

In addition, the vacuum suction device may be easily attached to a predetermined structure only by simple operation through the rotation of the cap. Moreover, once the device is attached through suction, it may firmly support various objects and shelves while staying firmly fixed for a long time.

BEST MODE

Hereinafter, embodiments of the present disclosure configured as described above will be described in detail with reference to the accompanying drawings.

Figure 1:
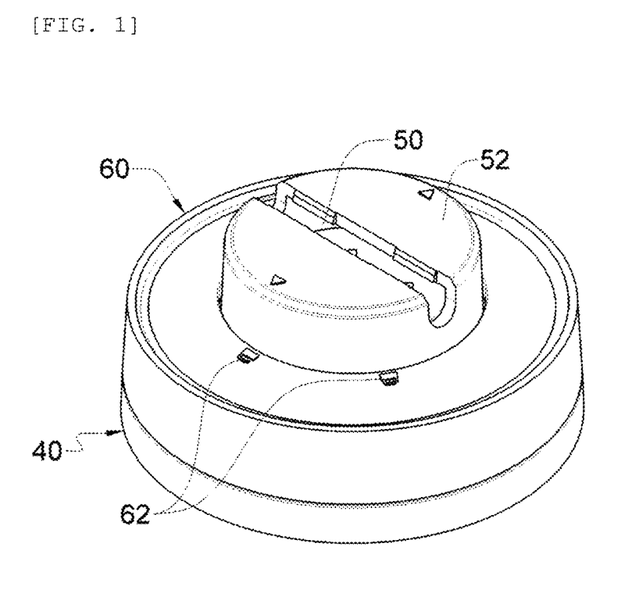
FIG. 1 is a perspective view showing the configuration of a vacuum suction device according to the present disclosure.
Figure 2A:
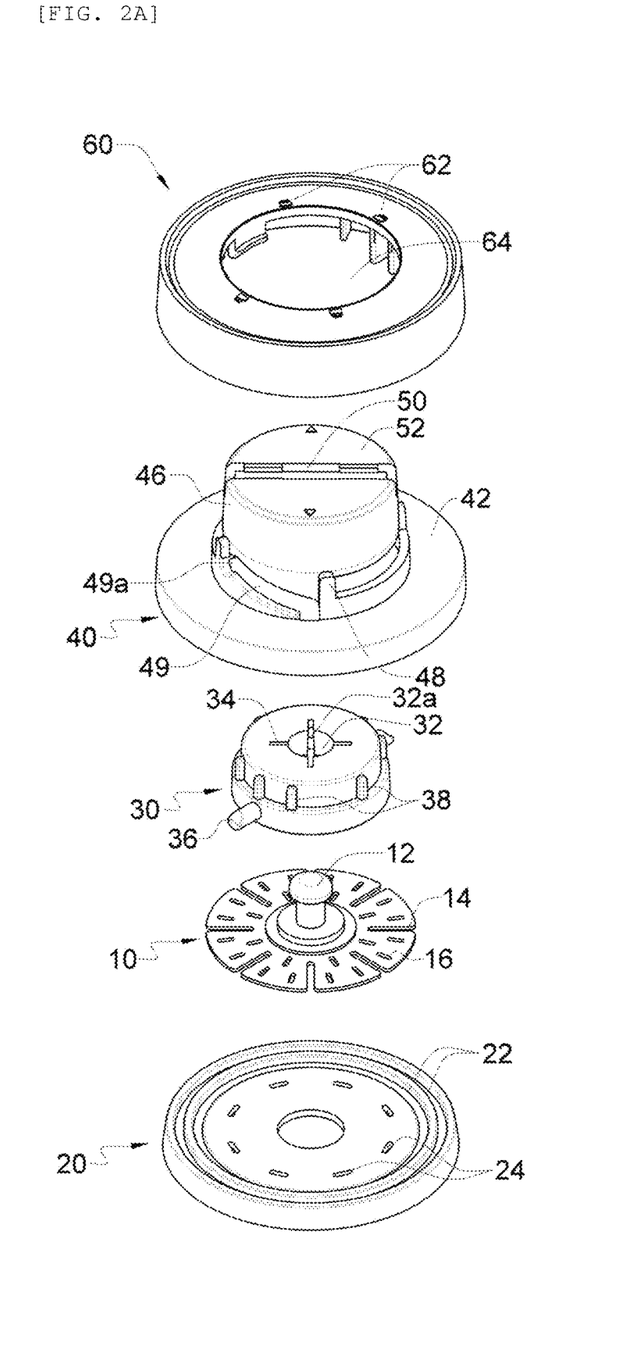
FIGS. 2A and 2B are exploded perspective views showing the configuration of the vacuum suction device according to the present disclosure.
Figure 2B:
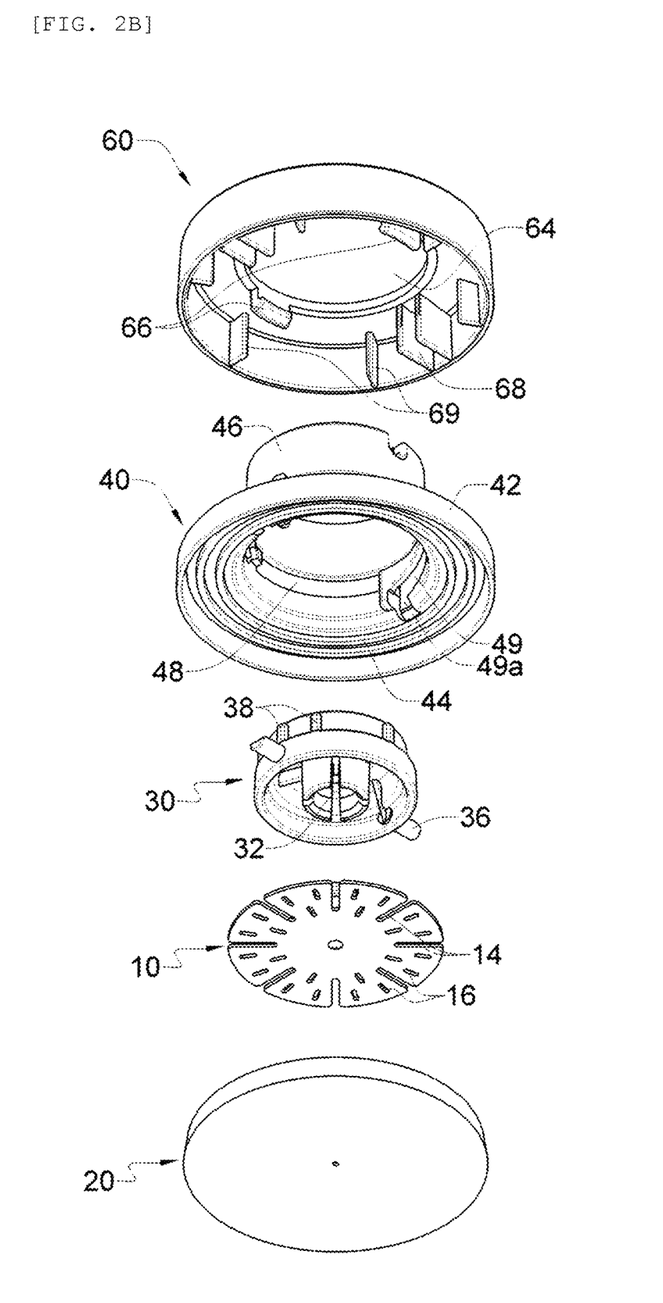
Figure 3A:
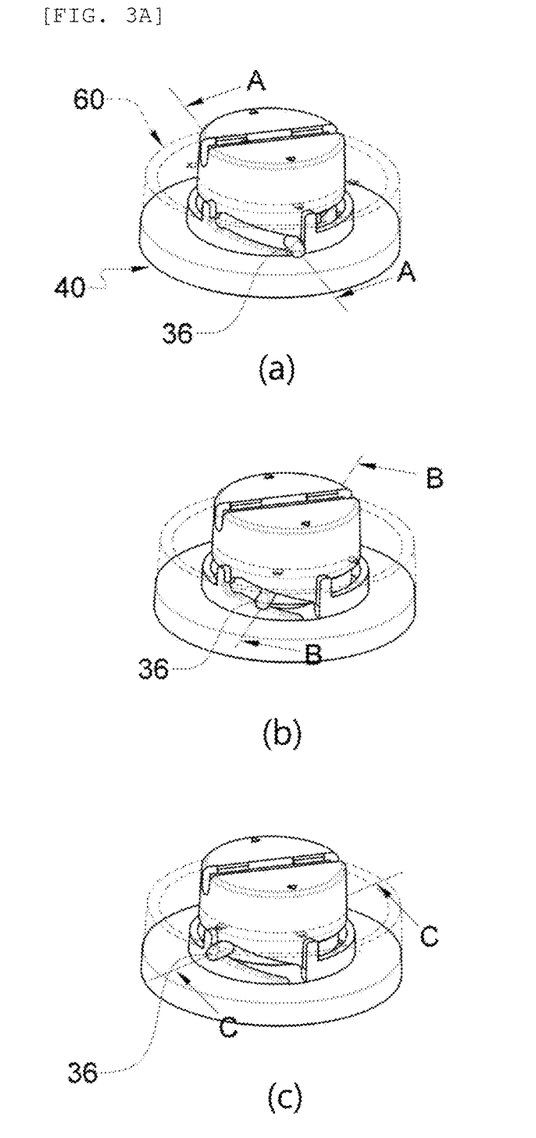
FIG. 3A is a perspective view illustrating an operation state of the vacuum suction device according to the present disclosure.
Figure 3B:
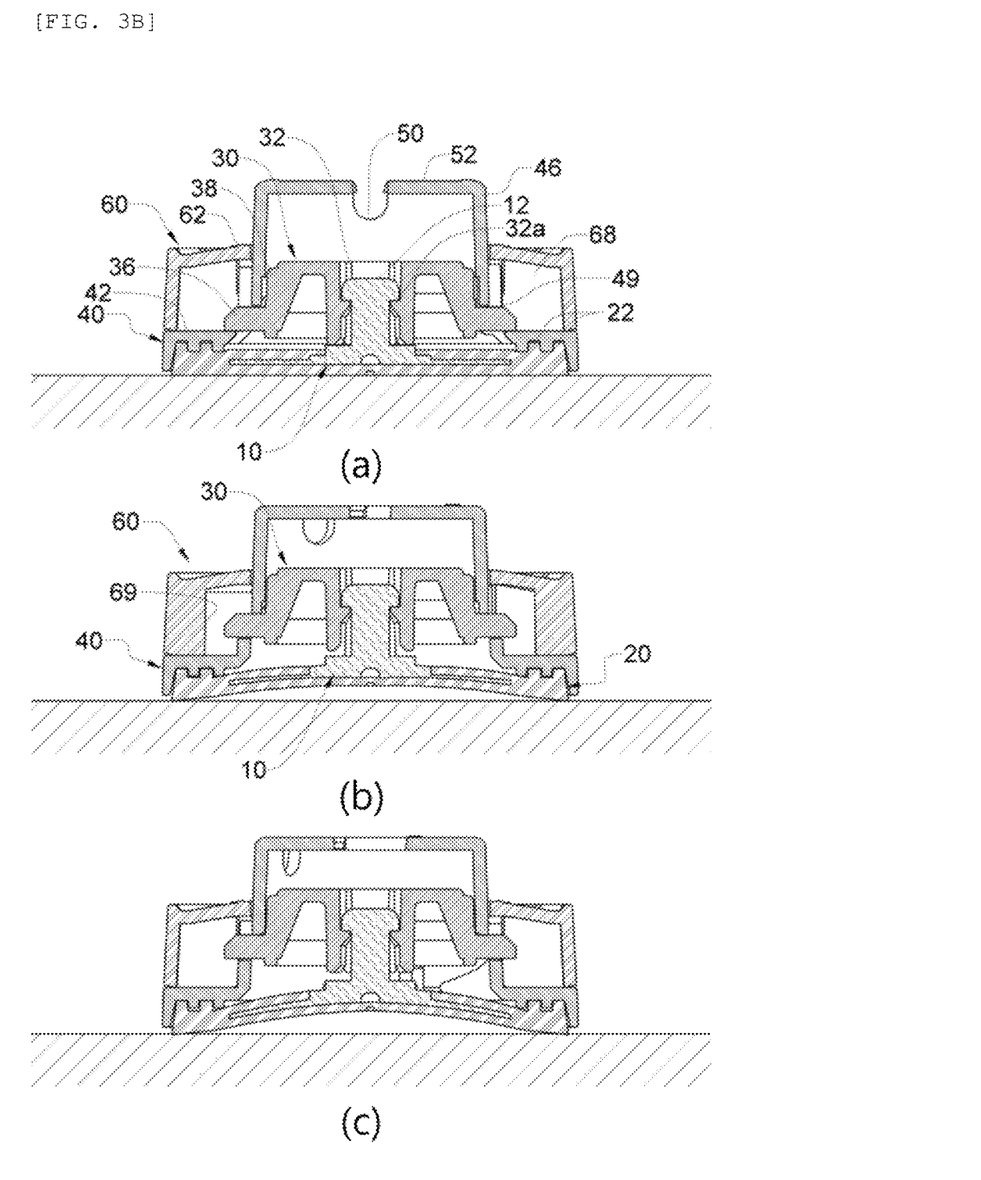
FIG. 3B is a cross-sectional view taken along line A-A' and line B-B' and line C-C' in FIG. 3A.

FIG. 1 is a perspective view showing the configuration of a vacuum suction device according to the present disclosure, and FIGS. 2A and 2B are exploded perspective views showing the configuration of the vacuum suction device according to the present disclosure. FIG. 3A is a perspective view illustrating an operation state of the vacuum suction device according to the present disclosure, and FIG. 3B is a cross-sectional view taken along line A-A' and line B-B' and line C-C' in FIG. 3A.

First, the vacuum suction device according to the present disclosure is implemented by forming the suction device in a specific structure so as to be fixed to glass, a tile, a smooth wall, or the like in a suction manner to facilitate attachment and detachment while exhibiting strong suction.

To this end, the vacuum suction device according to the present disclosure includes an suction plate 20 injection-molded and including an insert 10 of a specific structure, a rotor 30 rotatably mounted on an upper portion of the suction plate 20 to apply an external force to the suction plate 20, a base member 40 configured to enclose the suction plate 20 and the rotor 30, and a cap 60 mounted on the base member 40 in a rotatable structure.

The insert 10 is formed in a substantially disk shape with a coupling protrusion 12 protruding in the center of the top surface thereof, and is manufactured as a structure integrated with the suction plate 20 through double injection. Thus, the insert forms a framework of the suction plate 20, which is formed made of a soft material, and provides smooth resilience to the suction plate 20.

Multiple injection grooves 14 is formed radially at regular intervals in the body of the insert 10 having a substantially disk shape. In addition, multiple injection holes 16 are between the injection grooves 14 through perforation such that the insert is firmly integrated with the suction plate 20 through a predetermined injection process.

The coupling protrusion 12 of the insert 10 has an extended head diameter at an upper end thereof, and is configured to be inserted into a holding step 32a provided in the coupling hole 32 of the rotor 30 and then held.

The suction plate 20 is formed in a disk shape with a predetermined thickness and provided with the insert 10 mounted therein and is configured to selectively provide suction thorough the bottom surface thereof. The suction plate 20 may be formed of a synthetic resin material with a soft hardness value to provide very excellent auction while reflecting both elastic and rubber characteristics.

Reference numeral 24 represents multiple injection pressure support grooves formed through perforation to support injection pressure during the double injection process including the insert 10.

In addition, a pair of anti-slip ribs 22 protrudes to form a circular shape along the edge portion of the top surface of the suction plate 20 to prevent unintended deformation or pushing due to external force.

The rotor 30 has a substantially cylindrical shape, and includes a coupling hole 32 formed in the center thereof in a penetrating manner, the coupling protrusion 12 of the insert 10 being inserted into and coupled to the coupling hole, and guide protrusions 36 protruding from an outer circumferential surface of the coupling hole at predetermined points to form 180° therebetween. The rotor 30 is rotatably arranged on the top surface of the suction plate 20 through coupling between the coupling hole 32 and the coupling protrusion 12 of the insert 10.

Multiple elastic cutouts 34 are formed around the coupling hole 32 of the rotor 30 such that the coupling protrusion 12 of the insert 10 is smoothly mounted in a press-fitting manner. A holding step 32a is formed at a point having a predetermined height on the inner circumferential surface of the coupling hole 32 such that the expanded head of the coupling protrusion 12 is passed through the holding step and constrained.

Also, multiple close contact ribs 38 are vertically formed on the outer circumferential surface of the rotor 30 and arranged at regular intervals. Thus, when the rotor 30 is lifted by an external force, it is tightly fixed to the inner circumferential surface of a rotor coupling part 46 of the base member 40, and the friction between the curved close contact ribs 38 and the base member 40 may be reduced.

The base member 40 includes a suction plate coupling part 42 having a substantially disk shape or a wide cylindrical shape with an open bottom to contain the suction plate 2 positioned therebelow, and a rotor coupling part 46 protruding in a substantially cylindrical shape in the center of the top surface of the suction plate coupling part 42 such that the rotor 30 is embedded therein so as to be lifted and lowered.

The rotor coupling part 46 of the base member 40 includes a pair of rotor guide grooves 49 formed along the outer circumferential surface thereof to guide the rotor 30 to move up and down, and a pair of cap coupling grooves 48 allowing the cap 60 to be rotatably mounted therein.

The pair of cap coupling grooves 48 is formed to face each other by horizontal perforation to allow the hooks 66 of the cap 60 to horizontally move within a range of 50° to 70° (preferably, 60°).

The rotor guide groove 49 is formed between the cap coupling grooves 48, and inclined at a predetermined slope to guide the guide protrusion 36 of the rotor 30 to ascend and descend within the same angular range as the hook 66.

In addition, a fixed groove 49a is provided at the upper end of each of the rotor guide grooves 49 to extend downward such that the guide protrusion 36 of the rotor 30 is guided to the upper end, and is held in the fixed groove 49a to securely keep the rotor 30 lifted.

On the top surface of the rotor coupling part 46 of the base member 40, a pair of position indicators 52 having a triangular shape to guide the position of the cap 60 are formed and arranged at an interval of 180° therebetween.

Figure 5A:
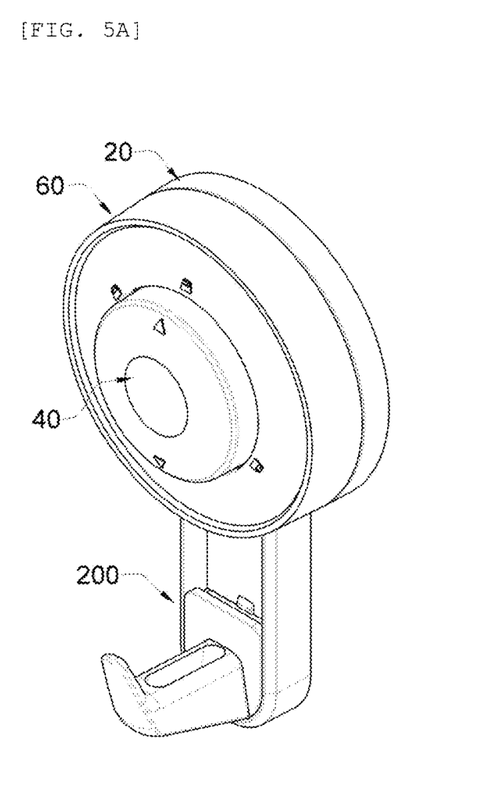
FIGS. 5A and 5B are views illustrating another embodiment of use of the vacuum suction device according to the present disclosure.
Figure 5B:
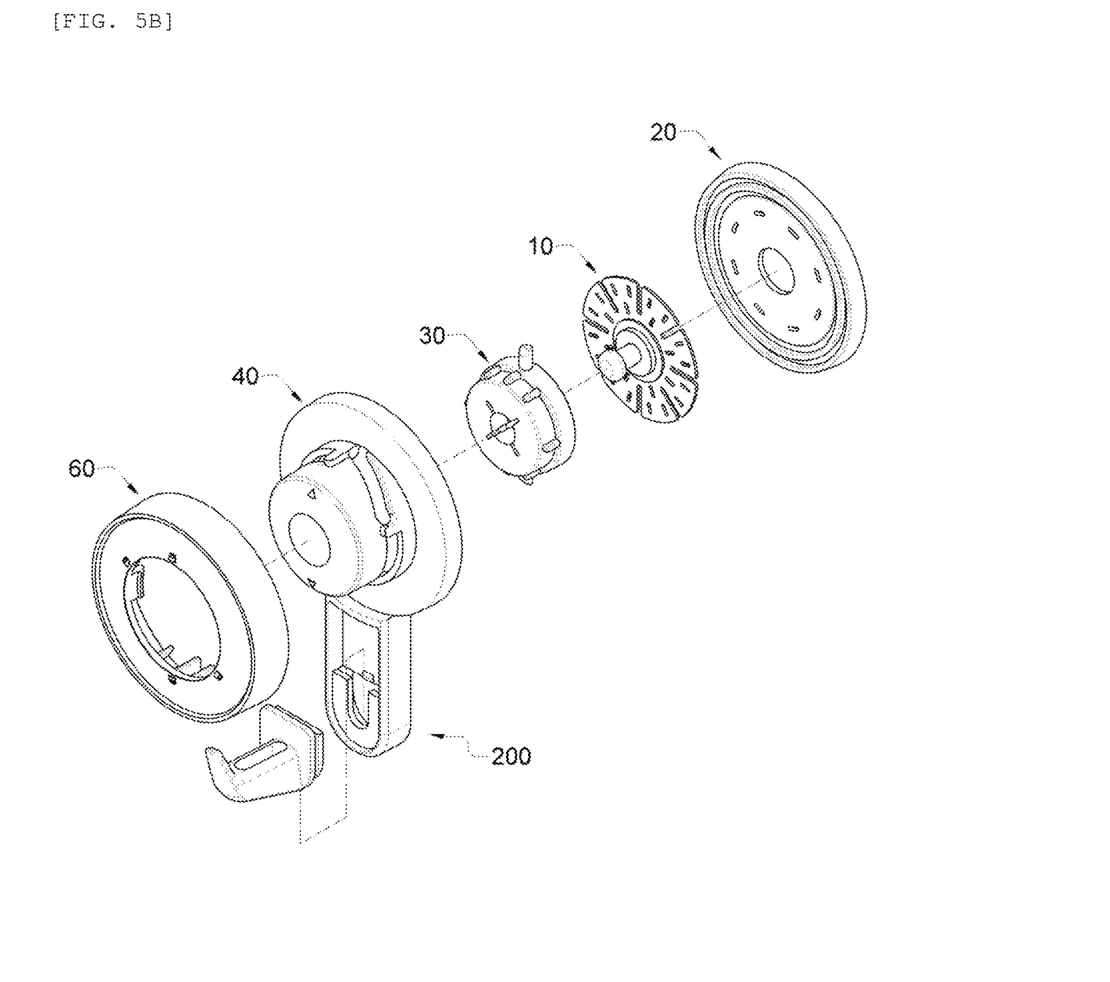

In the embodiment of the present disclosure, a mounting groove 50 for mounting a predetermined shelf 100 by the vacuum suction device is horizontally formed in the top surface of the rotor coupling part 46 of the base member 40 in a recessed manner. In addition, structures such as hooks, mounting rings 200, and various accessories may be provided at predetermined points on the base member 40 depending on the use of the vacuum suction device (see FIGS. 5A and 5B).

In addition, on the ceiling surface of the suction plate coupling part 42 of the base member 40, a pair of rib seating grooves 44 are formed at places corresponding to the pair of anti-slip ribs 22 protruding from the top surface of the suction plate 20.

The cap 60 has a substantially wide cylindrical shape and has an open bottom and a through hole 64 formed in the center thereof such that the cap is rotatably mounted on the base member 40 with the rotor coupling part 46 of the base member 40 inserted into the through hole 64.

A pair of hooks 66 spaced apart from each other by 180° is formed at a predetermined point adjacent to the through hole 64 of the cap 60 so as to be constrained by the pair of cap coupling grooves 48 of the base member 40. Thus, the cap 60 is mounted on the upper portion of the base member 40 as the pair of hooks 66 is guided in the cap coupling grooves 48 of the base member 40 to be rotatable by a predetermined angle.

In addition, guide protrusion coupling parts 68 arranged between the pair of hooks 66 are formed along the ceiling surface and inner circumferential surface of the cap such that the guide protrusions 36 of the rotor 30 penetrating the rotor guide grooves 49 of the base member 40 are inserted and constrained. Thus, when the cap 60 is rotated, an external force for interlocking the rotor 30 may be transmitted through the guide protrusions 36 constrained by the guide protrusion coupling parts 68 to cause the rotor 30 to vertically move along the rotor guide grooves 49.

Reference numeral 62 represents a state indicator that indicates the direction of suction or release of the vacuum suction plate with respect to the position indicators 52 of the base member 40 in the rotation of the cap, and reference numeral 69 represents multiple suction support ribs that press the base member more strongly while reinforcing the cap 60.

Next, the operation of the embodiment of the present disclosure configured as described above will be described in detail.

The vacuum suction device according to the present disclosure is configured as an integrated structure by coupling the suction plate 20 with the insert 10 mounted therein, the base member 40 coupled to the upper portion of the suction plate 20 and the rotor 30 with the guide protrusions 36 of the rotor 30 placed penetrating the rotor guide grooves 49, and the cap 60 rotatably mounted on the base member 40.

In order to fix the vacuum suction device to a glass, tile, or a smooth wall in a suction manner, the suction surface of the suction plate 20 is closely fixed to a predetermined attachment surface to which the vacuum suction device is to be fixed.

At this time, the position indicators 52 marked on the base member 40 are arranged to indicate the release position of the state indicator 62 provided to the cap 60 (FIG. 3A and FIG. 3B-(a)).

Then, for vacuum suction of the vacuum suction device, when external force is applied to the cap 60 to rotate the cap 60 clockwise by a predetermined angle, the pair of hooks 66 provided to the cap 60 rotates horizontally within the cap coupling grooves 48 of the base member 40. At the same time, the pair of guide protrusions 36 provided on the rotor 30 interlock with the guide protrusion coupling parts 68 of the cap 60 in a constrained state, and rise along the rotor guide groove 49 of the base member 40 while rotating by a predetermined angle (FIG. 3A and FIG. 3B-(b)).

When the hooks 66 move from one end to the other end of the cap coupling grooves 48, the cap 60 is rotated within a range of about 50° to 70°. In that state, the position indicators 52 marked on the base member 40 indicate the lock position of the state indicator 62 provided to the cap 60.

In addition, the guide protrusions 36 of the rotor 30 moved along the rotor guide grooves 49 of the base member 40 is located in the fixing groove 49a provided to the upper end side of the rotor guide grooves 49. At this time, the multiple close contact ribs 38 formed along the outer circumferential surface of the rotor 30 may come into contact with the inner circumferential surface of the rotor coupling part 46 of the base member 40, thereby maintaining a firmly fixed state without any shaking (FIG. 3A and FIG. 3B-(c)).

That is, as shown in FIGS. 3A and 3B, when an external force for rotation around the base member 40 fixed at a predetermined point is applied to the cap 60, the rotor 30 having the guide protrusions 36 constrained by the cap 60 rotates in engagement with the cap 60 and rises by a predetermined height through the rotor guide grooves 49 of the base member 40.

As the guide protrusions 36 of the rotor 30 are raised by a predetermined angle through the rotor guide grooves 49 of the base member 40, the coupling protrusion 12 of the insert 10 inserted into and coupled to the coupling hole 32 of the rotor 30 in a penetrating manner is also raised in conjunction. Accordingly, as the central portion of the auction plate 20 forming an integral body with the insert 10 mounted therein is lifted, a vacuum is formed between the central portion of the suction plate 20 and the corresponding-attachment surface spaced apart from each other by a predetermined distance.

At this time, the anti-slip ribs 22 provided on the top surface of the suction plate 20 may prevent unintended deformation when the suction plate 20 move, and also prevents the distortion of the suction plate 20. The insert 10 mounted in the suction plate 20 may also form the framework of the suction plate 20, while allowing the central portion of the suction plate 22 to smoothly move up and down without being distorted.

Figure 4:
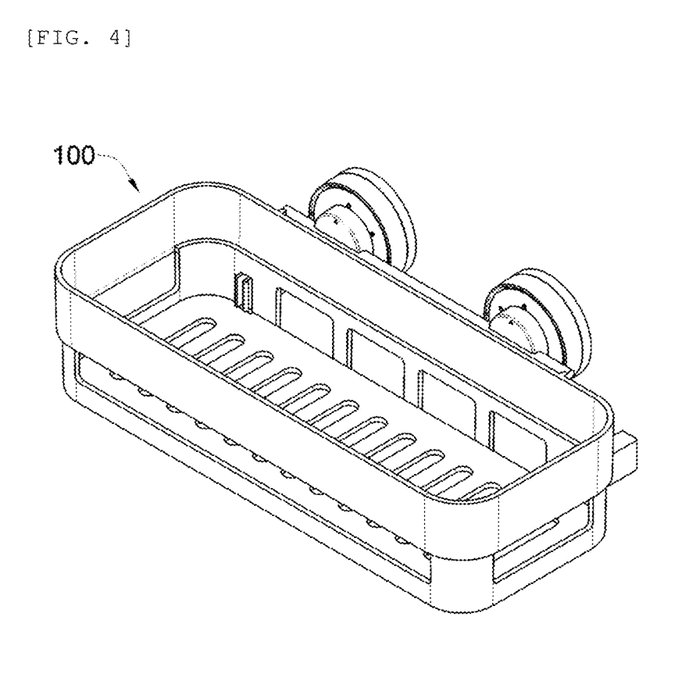
FIG. 4 is a view illustrating an embodiment of use of the vacuum suction device according to the present disclosure.

Accordingly, since strong suction may be maintained between the attachment surface and the suction plate 20 according to the vacuum suction, various shelves 100 or objects may be mounted using the mounting groove 50 or hook provided in the vacuum suction device (see FIG. 4).

In separating the vacuum suction device from the detachment surface, an external force is applied to the cap 60 to rotate the cap 60 counterclockwise, and thus the rotor 30 and insert 10 are lowered to a predetermined height. Then, the vacuum state formed between the central portion of the suction plate 20 and the attachment surface may be released, allowing the suction plate 20 to be easily separated from the attachment surface.

Although preferred embodiments of the present disclosure have been described with reference to the drawings, those skilled in the art will appreciate that various modifications and variations can be made in the embodiments without departing from the spirit or scope of the disclosure described in the appended claims. Such modifications are not to be understood individually from the technical idea or perspective of the embodiments.

I claim:

1. A vacuum suction device comprising:
   a suction plate formed in a disk shape with a predetermined thickness and provided with a disk-shaped insert having a coupling protrusion at a center thereof, the insert being configured to selectively provide suction through a bottom surface thereof;
   a rotor formed in a cylindrical shape and having a coupling hole formed through a center thereof and guide protrusions protruding from opposite sides of an outer circumference of the rotor, the rotor being mounted in the center of a top surface of the suction plate by the coupling hole and the coupling protrusion of the insert;
   a base member comprising:
   a disk-shaped suction plate coupling part configured to accommodate the suction plate in a lower portion thereof; and
   a rotor coupling part protruding in a cylindrical shape at a center of a top surface of the suction plate coupling part to allow the rotor to be accommodated therein and to move up and down, the rotor coupling part being provided with a pair of penetrated rotor guide grooves and a pair of penetrated cap coupling grooves at a predetermined point on an outer circumferential surface thereof; and
   a cap formed in a wide cylindrical shape with an open bottom and having a through hole in a center thereof, the cap being rotatably mounted on an upper portion of the base member by a pair of hooks constrained in the pair of cap coupling grooves with the rotor coupling part of the base member arranged through the through hole to apply an external force to the rotor.

2. The vacuum suction device of claim 1, wherein a body of the insert accommodated in the suction plate comprises:
   a plurality of injection grooves formed radially at regular intervals; and
   a plurality of injection holes formed between the injection grooves.

3. The vacuum suction device of claim 2, wherein the suction plate is formed of a soft synthetic resin material.

4. The vacuum suction device of claim 1, further comprising:
   a pair of anti-slip ribs protruding from an edge of the top surface of the suction plate; and
   a pair of rib seating grooves formed in a ceiling surface of the suction plate in a recessed manner to correspond to the anti-slip ribs.

5. The vacuum suction device of claim 1, wherein the suction plate is formed of a soft synthetic resin material.

6. The vacuum suction device of claim 1, further comprising:
   a plurality of elastic cutouts formed around the coupling hole of the rotor for smooth mounting of the coupling protrusion of the insert; and
   a holding step formed at a point on an inner circumferential surface of the coupling hole at a predetermined height to constrain a head portion of the coupling protrusion of the insert.

7. The vacuum suction device of claim 1, further comprising:
   close contact ribs formed on an outer circumferential surface of the rotor and arranged at regular intervals to securely and closely contact an inner circumferential surface of the rotor coupling part of the base member when the rotor rises and to prevent friction against the base member.

8. The vacuum suction device of claim 1, wherein the pair of cap coupling grooves formed in the rotor coupling part of the base member is formed to correspond to points facing each other such that each of the pair of hooks of the cap is horizontally moved within a predetermined angular range,
   wherein the pair of rotor guide grooves formed between the pair of cap coupling grooves is inclined at a predetermined slope such that the guide protrusions of the rotor are guided to move up and down while rotating within the same angular range as the pair of hooks, wherein the pair of rotor guide grooves is provided at an upper end thereof with a fixing groove extending downward to fix the guide protrusions in place.

9. The vacuum suction device of claim 1, further comprising:

the pair of hooks protruding at points adjacent to the through hole in a ceiling surface of the cap, the pair of hooks being spaced apart from each other by 180°; and a guide protrusion coupling part formed between the pair of hooks over the ceiling surface and the inner circumferential surface, wherein the guide protrusions are fitted into and constrained by the guide protrusion coupling part.

10. The vacuum suction device of claim 4, wherein the suction plate is formed of a soft synthetic resin material.

* * * * *